Sept. 1, 1964           W. J. STARK           3,147,392
VARIABLE AIRGAP REGENERATIVE ACTION MAGNETOSTRICTIVE TRANSDUCER
Filed Jan. 19, 1962           2 Sheets-Sheet 1

WILLIAM J. STARK INVENTOR.

BY *Gary C. Honeycutt*

AGENT

Sept. 1, 1964   W. J. STARK   3,147,392
VARIABLE AIRGAP REGENERATIVE ACTION MAGNETOSTRICTIVE TRANSDUCER
Filed Jan. 19, 1962   2 Sheets-Sheet 2

WILLIAM J. STARK INVENTOR.

BY *Gary C. Honeycutt*
AGENT

United States Patent Office 3,147,392
Patented Sept. 1, 1964

3,147,392
VARIABLE AIRGAP REGENERATIVE ACTION
MAGNETOSTRICTIVE TRANSDUCER
William J. Stark, Tulsa, Okla., assignor to Jersey Production Research Company, a corporation of Delaware
Filed Jan. 19, 1962, Ser. No. 167,280
6 Claims. (Cl. 310—26)

The present invention is concerned with improvements in magnetostriction transducers. Specifically, the invention is directed to a magnetostrictive transducer wherein fluctuations in the length of a magnetostrictive element are combined with a variable air gap to produce a more efficient transformation of mechanical vibrations into electrical energy and vice versa. In a preferred embodiment, a positive magnetostrictive element acts in cooperation with a negative magnetostrictive element and a variable air gap in a manner such that all three effects are additive.

Magnetostriction is the property exhibited by certain materials of undergoing a change in dimensions upon being magnetized. Positive magnetostrictive materials expand, while negative magnetostrictive materials contract upon being placed in a field of magnetic flux. Numerous such materials are known. Positive striction is characteristic of 2V Permendur, Permalloy, and iron-palladium alloys. 2V Permendur consists essentially of 2% vanadium, 48% iron and 50% cobalt. Permalloy is a nickel-iron alloy, two common examples of which are 45 Permalloy (45% Ni) and 68 Permalloy (68% Ni). Negative striction is characteristic of nickel and nickel-palladium alloys.

Various magnetostrictive transducers are known in the prior art, an example of which is shown in the patent to James R. Ording, U.S. 2,712,124. The Ording device is considered typical of such transducers known to the art, in that a direct permeable metal path is provided for magnetic flux to pass between the poles of a permanent magnet. Accordingly, the only effect operative in that device to produce a change in magnetic flux, when transforming mechanical vibrations into electrical energy, is a slight distortion of the magnetostrictive element from its normal shape.

In contrast to the mono-functional operation of such known devices, the transducer of the present invention utilizes a magnetostrictive element positioned such that its vibrations produce a variable air gap in the magnetic flux path to create an additional change in magnetic flux intensity, thereby increasing the efficiency of the device. Moreover, in a preferred embodiment a positive magnetostrictive element is disposed in combination with a negative magnetostrictive element such that the contraction of one occurs additively with the elongation of the other on opposite sides of a single air gap, whereby variations in the size of the air gap are approximately doubled with respect to variations obtainable with a single magnetostrictive material.

Many industrial applications are known for magnetostriction transducers. When used to convert electrical oscillations into mechanical vibrations the transducer finds application in the generation of ultrasonic vibrations for the purpose of cleaning, dissolving, filtering and other processes. When used to convert mechanical vibrations into electrical oscillations the device is useful to detect and measure pressure pulses, for example, as a geophone in the seismic exploration of subterranean strata or as a detector in the acoustic logging of well bores in the earth.

In its broadest aspect, the essential elements of the device of the invention are an elongated magnetostrictive element, a permanent magnet and a solenoid coil. The magnetostrictive element is located in the path of magnetic flux generated by the magnet, and arranged to provide a closed path for the flux, except for a narrow gap, the width of which is made variable by fluctuations in the length of the magnetostrictive material. The coil is positioned to be traversed by the flux, and more specifically, is positioned to be traversed by changes in flux caused by variations in the width of the gap.

In a preferred embodiment, the apparatus includes a tubular positive magnetostrictive element; a negative magnetostrictive rod; a permanent magnet having one pole with dimensions corresponding substantially to the cross-section of said tubular element, and the other pole with dimensions corresponding substantially to the cross-section of said rod; a solenoid coil wound about said rod as core; and a flux-permeable end-piece also having dimensions corresponding substantially to the cross-section of said tubular element.

One pole of the magnet is affixed to one end of the tubular positive magnetostrictive element, substantially closing and sealing it. The other pole of the magnet extends within the tubular element a substantial distance, and is affixed to one end of the magnetostrictive rod. The rod extends from the magnet to a point just beyond the other end of the tubular element. The solenoid coil is positioned upon the rod along a substantial fraction of its length, primarily near the end opposite the magnet. The flux-permeable end-piece is affixed to the end of the rod opposite the magnet, whereby a narrow air gap is provided between the end-piece and the end of the tubular element opposite the magnet.

The width of the air gap is correlated with the strength of the magnet and the other dimensions of the device to ensure that the magnetic lines of force generated by the magnet are divided between a path which includes the narrow air gap and a shorter path which cuts across the solenoid windings and the annulus between the two magnetostrictive elements. The purpose of this relationship will be made clear by subsequent explanation of how the device operates.

A detailed description of the invention is provided by reference to the following drawings.

Figures 1, 2:
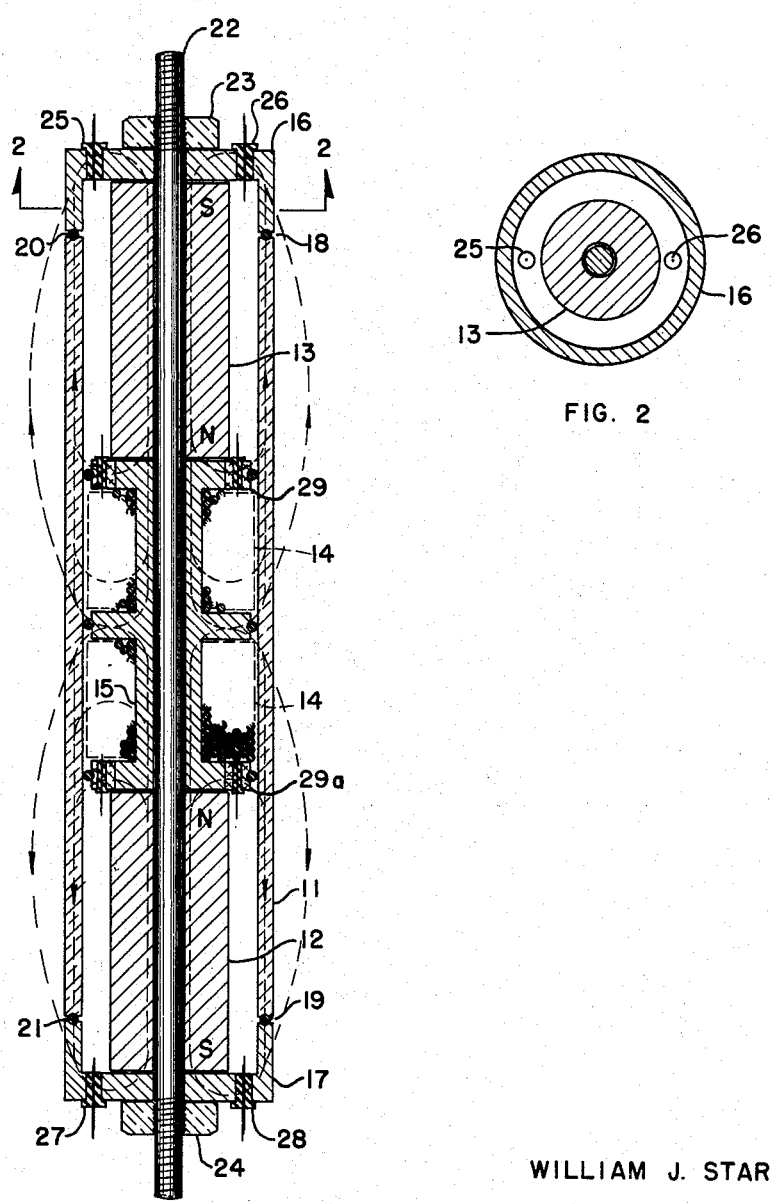
FIGURE 1 is a longitudinal central section through one embodiment of the invention, wherein a single magnetostrictive material is employed in combination with a variable air gap.
FIGURE 2 is a plan view along the section 2—2 of FIGURE 1.

Referring now to FIGURE 1, the essential elements of the device are tubular magnetostrictive member 11, cylindrical permanent magnets 12 and 13, solenoid windings 14, solenoid core 15 and end pieces 16 and 17, forming high reluctance "air" gaps 18 and 19. The air gaps are spaced by sealing rings 20 and 21 made of rubber, neoprene, or other soft elastic material. Core 15 and end pieces 16 and 17 are made of any flux-permeable material, soft iron for example.

Tubular member 11 may be either a positive or a negative magnetostrictive material, preferably positive, as will be explained below. Although magnetostrictive element 11 is preferably a cylinder of circular cross-section as shown, it may be of rectangular, polygonal, or irregular cross-section if desired. Cylindrical magnets 12 and 13, solenoid core 15 and end pieces 16 and 17 are each provided with a longitudinal central opening and are assembled along non-magnetic rod 22 and held together by nuts or equivalent means 23 and 24 screwed on each end of rod 22. Each successive element mounted along rod 22 abuts firmly against the element adjacent thereto. The magnets are arranged with like poles adjacent the solenoid. Pressure plugs 25, 26, 27 and 28, made of hard rubber or Teflon, for example, are provided to accommodate the leads from solenoids 14. Similar plugs are provided in the ends of core 15.

Magnetic lines of force are established separately by each of the magnets. The flux path in either case extends a substantial distance within solenoid core 15. Since like magnetic poles are adjacent the ends of core 15, the lines of force are mutually repelled as they approach the central portion of the core, and are thereby forced in part to cut across the solenoid windings, thence through magnetostrictive member 11, end pieces 16 and 17, respectively, and finally to the opposite poles. "Short-circuiting" of the flux paths through the ends of core 15, directly across to member 11 without crossing the solenoids, is prevented by providing a non-permeable material, for example, aluminum, about the perimeter of the core ends, as designated by numerals 29 and 29a.

FIGURE 2 shows the cylindrical construction of the device and the relationship of magnet 13 to rod 22 and end piece 16. Rod 22 is a non-magnetic material, for example, stainless steel. End pieces 16 and 17 are a flux-permeable material, such as soft iron.

In operation as a means to convert pressure oscillations into electrical pulses, for example as an acoustical well-logging detector, cylinder 11 reacts to a pressure pulse by undergoing slight elongation. This is a purely mechanical behavior, unrelated to magnetostriction. Such elongation decreases the width of air gaps 18 and 19, thereby lowering the reluctance of each of the separate magnetic paths and increasing the flux through magnetostrictive cylinder 11. The increased flux causes still further elongation of cylinder 11 (positive magnetostriction), which further reduces the width of the air gaps, up to the point of magnetic saturation of the magnetostrictive material employed. This cumulative change in flux generates an output voltage in the separate solenoid coils 14 which is related to the intensity of the original pressure pulse.

On the other hand, if tubular element 11 is negatively magnetostrictive, substantially pure nickel for example, the initial reduction of the air gaps and consequent increase of magnetic flux operates to oppose further elongation, and in fact causes contraction of element 11. Thus, the flux intensity does not build to as great an extent as in the case of positive striction; but it is the rate of change in intensity which controls the amplitude of the voltage pulse created in the solenoids, not the overall extent or magnitude of the change. Thus it is readily seen that whether element 11 exhibits positive or negative striction, it nevertheless cooperates with the variable air gap to provide a pulse amplitude greater than can be achieved separately with a magnetostrictive material alone, or with a variable reluctance gap alone.

Figure 3:
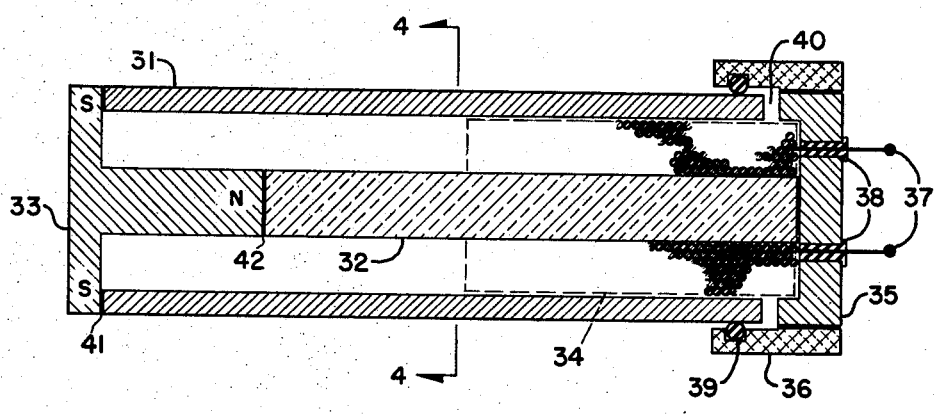
FIGURE 3 is a longitudinal central section of a preferred embodiment of the invention, wherein a positive magnetostrictive element is used in combination with a negative magnetostrictive element to produce a variable air gap in the path of magnetic flux lines.

Referring now to FIGURE 3, the preferred embodiment of the invention comprises cylindrical positive magnetostrictive member 31, negative magnetostrictive rod 32, permanent magnet 33, solenoid windings 34, flux-permeable end piece 35 and non-magnetic end member 36. Solenoid terminals 37 extend through pressure plugs 38. A seal is provided by O-ring 39. The dimensions of the various pieces are fixed to provide an air gap 40. Magnet 33 is bonded to the magnetostrictive materials 31 and 32 by any conventional means. In the embodiment shown, these elements are bonded with a synthetic polymer cement at points 41 and 42. Also, these elements may readily be provided with threads and screwed together to make a fluid-tight joint. End piece 35 is similarly bonded to members 32 and 36. The pressure plugs 38 are made of any suitable material, such as hard rubber or Teflon, for example. It will be apparent that magnet 33 may be replaced by a magnet the polarity of which is opposite that shown in the drawing, without changing the essential character of the device.

Figure 4:
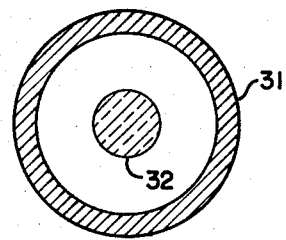
FIGURE 4 is a plan view along the section 4—4 of FIGURE 3.

FIGURE 4 illustrates the cylindrical construction of the apparatus and the relationship of magnet 33 to the magnetostrictive materials 31 and 32. Cylinder 31 is preferably an iron-palladium alloy, while rod 32 is preferably a nickel-palladium alloy. However, it is within the scope of the invention to employ any positive magnetostrictive material as cylinder 31 and any negative magnetostrictive material as rod 32.

In operation as a means to convert pressure oscillations into electrical pulses, for example as a seismic signal detector, cylinder 31 is subjected to lateral compression by a pressure pulse, which in turn causes slight elongation, due to Poisson's ratio. Poisson's ratio is defined as the ratio of percent change in the lateral dimension to percent change in length, as a result of applied force, and is a fundamental elastic property of solid bodies. Such elongation decreases air gap 40, which in turn reduces the reluctance of the magnetic path which exists in members 32, 35 and 31. The reduced reluctance increases the flux through these materials which causes an additional elongation of cylinder 31 and a contraction of rod 32. This additional change in the lengths of the magnetostrictive materials further reduces the size of air gap 40. These concurrent events are additive in building up the magnetic lines of force, which as a result generates an output voltage in solenoid windings 34 which is transmitted to output terminals 37 and then to amplifiers and recording equipment.

In the embodiment of FIGURE 3, magnetostrictive rod 32 may be replaced by soft iron or other magnetic material without departing from the scope of the invention in its broadest aspect. The operation of such an embodiment is essentially the same as described above in connection with FIGURES 3 and 4, except of course the amplitude of the pulse generated in solenoid 34 is considerably reduced.

What is claimed is:

1. A magnetostrictive transducer comprising an elongated magnetostrictive element, a permanent magnet, and a solenoid coil, said magnetostrictive element being located in the path of magnetic flux generated by said magnet, and arranged to provide a closed path for the flux, except for a narrow gap located such that the width thereof is made variable by fluctuations in the length of said magnetostrictive element, and said coil being positioned to be traversed by changes in said flux caused by variations in the width of said gap.

2. A magnetostrictive transducer comprising a tubular magnetostrictive element; a pair of permanent magnets within said tubular element, the magnetic poles thereof being oriented substantially coaxially with said tubular element; a pair of solenoid coils having a common permeable core, and also oriented substantially coaxially within said tubular element; a pair of flux-permeable end-pieces closing the respective ends of said tubular element and spaced therefrom by a soft, elastic, non-magnetic material; like poles of said magnets abutting the opposite ends of said core, and the remaining like poles of said magnets abutting the said end-pieces.

3. A magnetostrictive transducer comprising a tubular positive magnetostrictive element; a negative magnetostrictive rod; a permanent magnet having one pole with dimensions corresponding substantially to the cross-section of said tubular element, and the other pole with dimensions corresponding substantially to the cross-section of said rod; a solenoid coil wound about said rod; a flux-permeable end-piece also having dimensions corresponding substantially to the cross section of said tubular element; the pole of said magnet which corresponds to said tubular element being affixed thereto at one end thereof, and the other pole of said magnet extending within said tubular element; one end of said rod being affixed to the end of said magnet corresponding thereto, and extending within said tubular element substantially coaxially therewith; said rod being of a length necessary to extend somewhat beyond the end of said tubular element opposite said magnet; said flux-permeable end-piece being affixed to the end of said rod opposite said magnet and extending radially therefrom to provide a relatively narrow gap between said end-piece and the end of said tubular member opposite said magnet.

4. A magnetostrictive transducer comprising an elongated magnetostrictive element, a permanent magnet, and a solenoid coil having an elongated permeable core, one end of said magnetostrictive element abutting one pole of said magnet and one end of said core abutting the other pole of said magnet, the remaining end of said core terminating near the remaining end of said magnetostrictive element to provide an air gap the width of which is made variable by fluctuations in the length of said magnetostrictive element, and said coil being positioned along said core to be traversed by changes in magnetic flux caused by variations in the width of said gap.

5. A magnetostrictive transducer comprising an elongated positive magnetostrictive element, an elongated negative magnetostrictive element, a permanent magnet, and a solenoid coil, said magnetostrictive elements being located in the path of magnetic flux generated by said magnet and arranged to provide a closed path for said flux, except for a narrow gap the width of which is made variable by fluctuations in the length of said magnetostrictive elements, and said coil being positioned to be traversed by changes in said flux caused by variations in the width of said gap.

6. A magnetostrictive transducer comprising a permanent magnet and a magnetostrictive element arranged in combination to form a permeable loop for flux generated by said magnet, said loop having a narrow gap therein the width of which is determined by the degree of elongation experienced by said magnetostrictive element, and a conductor coil positioned transversely in the path of said flux, whereby an electrical output is generated therein responsive to changes in the length of said magnetostrictive element.

References Cited in the file of this patent

UNITED STATES PATENTS

| | | | |
|---|---|---|---|
| 2,484,036 | Kauke | Oct. 11, | 1909 |
| 2,490,273 | Keon | Dec. 6, | 1949 |
| 3,009,131 | Woodworth | Nov. 14, | 1961 |

FOREIGN PATENTS

| | | | |
|---|---|---|---|
| 168,483 | Sweden | Sept. 1, | 1959 |